(12) United States Patent
Knowlton

(10) Patent No.: US 9,301,650 B1
(45) Date of Patent: Apr. 5, 2016

(54) ROTATABLE COFFEE POD STORAGE DEVICE

(71) Applicant: Bryan Knowlton, San Angelo, TX (US)

(72) Inventor: Bryan Knowlton, San Angelo, TX (US)

(*) Notice: Subject to any disclaimer, the term of this patent is extended or adjusted under 35 U.S.C. 154(b) by 0 days.

(21) Appl. No.: 14/686,324

(22) Filed: Apr. 14, 2015

Related U.S. Application Data

(63) Continuation-in-part of application No. 14/618,088, filed on Feb. 10, 2015.

(51) Int. Cl.
*A47F 7/00* (2006.01)
*A47J 47/16* (2006.01)
*F16M 11/10* (2006.01)
*A47J 31/44* (2006.01)

(52) U.S. Cl.
CPC *A47J 47/16* (2013.01); *A47J 31/44* (2013.01); *F16M 11/10* (2013.01)

(58) Field of Classification Search
CPC ........... A47F 5/02; A47F 5/0037; A47F 5/03; A47J 31/3642; A47B 81/00
USPC ................... 211/163, 77, 78; D7/600.2, 600.4
See application file for complete search history.

(56) References Cited

U.S. PATENT DOCUMENTS

| | | | | |
|---|---|---|---|---|
| 1,448,259 A * | 3/1923 | Cook | ................. | A47G 23/0616 294/143 |
| 1,927,283 A * | 9/1933 | Hernandez | ................. | A47F 5/03 211/78 |
| 2,662,644 A * | 12/1953 | Alexander | ............ | A47F 5/0037 211/131.1 |
| 2,883,063 A * | 4/1959 | Baren | ....................... | B01L 9/00 211/78 |
| 3,805,965 A * | 4/1974 | Champagne | .......... | A47F 5/0025 108/94 |
| 4,334,623 A * | 6/1982 | Geary | ................ | A47G 23/0208 211/131.1 |
| 4,534,471 A * | 8/1985 | Zahn | ..................... | B43M 99/008 211/163 |
| D311,565 S * | 10/1990 | Buri, Jr. | ......................... | D3/259 |
| D392,163 S * | 3/1998 | Jenkinson | ...................... | D7/704 |
| 5,839,586 A * | 11/1998 | Smith | ....................... | A47F 5/04 211/163 |
| D491,768 S * | 6/2004 | Henry | ......................... | D7/600.4 |
| D508,349 S * | 8/2005 | Wu | .............................. | D6/680.1 |
| D617,124 S * | 6/2010 | Snider | ......................... | D6/708 |
| D634,137 S * | 3/2011 | Chapman | ..................... | D6/680.3 |
| D634,978 S * | 3/2011 | Tiemann | ..................... | D7/600.4 |
| D651,454 S * | 1/2012 | Chin | ............................ | D7/401.2 |
| D661,162 S * | 6/2012 | Hertaus | ....................... | D7/600.4 |
| D662,782 S * | 7/2012 | Tiemann | ..................... | D7/600.2 |
| D676,685 S * | 2/2013 | Dobelbower | ............... | D6/680.1 |
| D680,382 S * | 4/2013 | Tiemann | ................... | D7/600.2 |
| D680,383 S * | 4/2013 | Tsai | ............................ | D7/600.4 |
| D680,384 S * | 4/2013 | Tsai | ............................ | D7/600.2 |
| D686,465 S * | 7/2013 | Goodman | ................... | D7/600.4 |
| D688,529 S * | 8/2013 | Tiemann | ..................... | D7/600.2 |
| D698,607 S * | 2/2014 | Chen | ........................... | D7/600.4 |
| D700,017 S * | 2/2014 | Hertaus | ....................... | D7/600.4 |
| 8,887,930 B1 * | 11/2014 | Krull | ....................... | A47J 47/00 211/77 |
| 2002/0117460 A1 * | 8/2002 | Crosson | ................. | A47B 81/00 211/22 |
| 2005/0194336 A1 * | 9/2005 | Wu | ........................... | A47F 5/03 211/164 |

* cited by examiner

*Primary Examiner* — Joshua Rodden
*Assistant Examiner* — Kimberley S Wright
(74) *Attorney, Agent, or Firm* — Pierson IP, PLLC

(57) ABSTRACT

Embodiments disclosed herein describe systems and methods for a rotatable coffee pod storage device. The rotatable coffee pod storage device may have a plurality arms that are configured to receive coffee pods. The arms of the coffee pods may be configured to receive coffee pods in a direction that is perpendicular to the angle of rotation of the rotatable coffee pod storage device. Accordingly, a user may be able to easily and effectively insert and remove a plurality of coffee pods, while also conveniently storing the coffee pods and reducing the amount of space required to store the coffee pods.

8 Claims, 13 Drawing Sheets

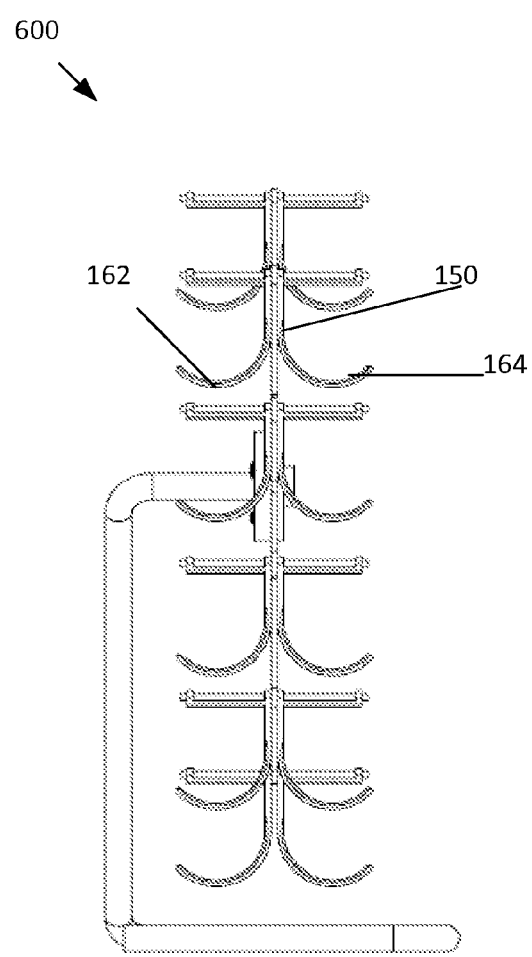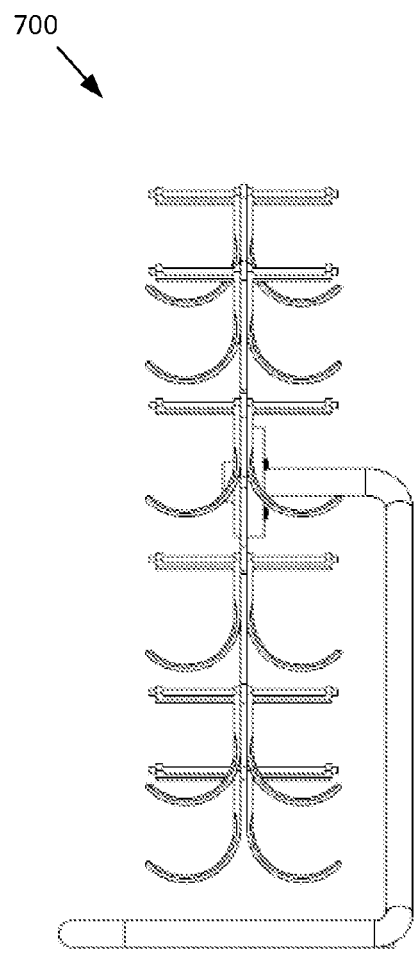
FIGURE 6
FIGURE 7

800

800

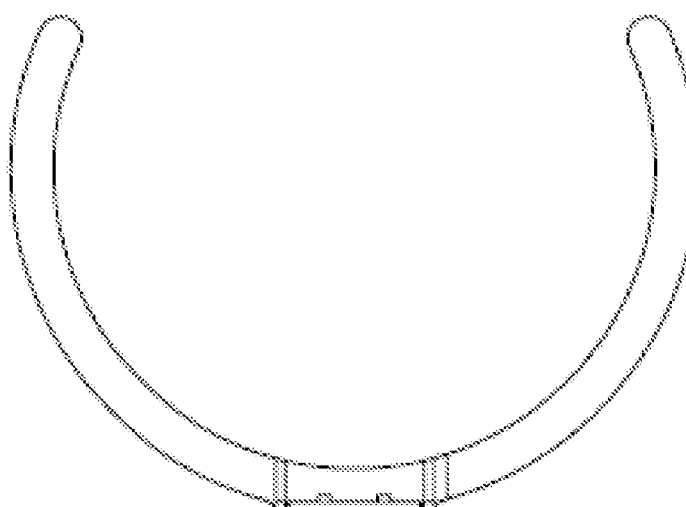
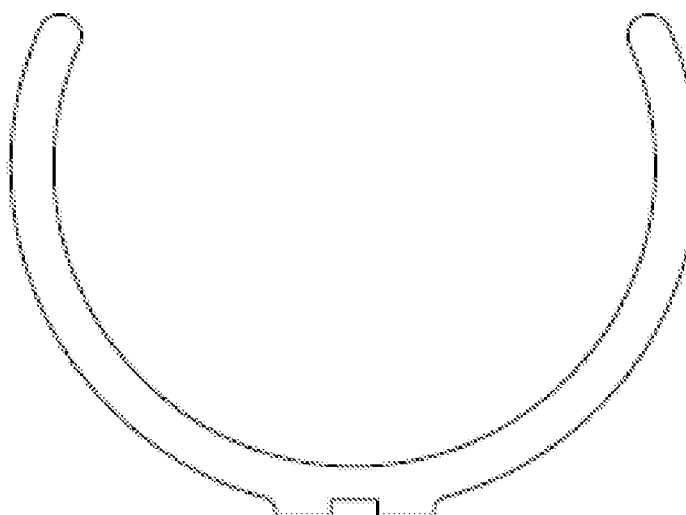
FIGURE 13
FIGURE 14

1500

1500

1500

1500

ROTATABLE COFFEE POD STORAGE DEVICE

CROSS-REFERENCE TO RELATED APPLICATIONS

This application is a continuation in part of U.S. Ser. No. 14/618,088 filed on Feb. 10, 2015, which is fully incorporated herein by reference in its entirety.

BACKGROUND INFORMATION

1. Field of the Invention

Examples of the present disclosure are related to systems and methods for a coffee pod storage device. More particularly, embodiments relate to a rotatable coffee pod storage device that is configured to receive coffee pods in a direction perpendicular to an angle of rotation of the coffee pod storage device.

2. Background

Single serving coffee makers, such as Keurig, have become prevalent in the marketplace. A single-serve coffee pod typically includes pre-ground coffee secured within a relatively small disposable container. These single serving coffee makers have a variety of configurations, such as single-serve coffee pods, packets, etc.

When using coffee pods, users are required to purchase an ample amount of the coffee pods. Conventionally, coffee pods are stored in racks with a plurality of rows and columns. However, these racks require valuable shelf or cabinet space. However, storing the coffee pods may require an excessive amount of space. Accordingly, the quantity of stored and readily accessible coffee pods makes effectively and efficiently storing coffee pods arduous.

Accordingly, needs exist for more effective and efficient systems and methods storing coffee pods.

SUMMARY

Embodiments disclosed herein describe systems and methods for a rotatable coffee pod storage device. The rotatable coffee pod storage device may have a plurality arms that are configured to receive coffee pods. The arms of the coffee pods may be configured to receive coffee pods in a direction that is perpendicular to the angle of rotation of the rotatable coffee pod storage device. Accordingly, a user may be able to easily and effectively insert and remove a plurality of coffee pods, while also conveniently storing the coffee pods and reducing the amount of space required to store the coffee pods.

Embodiments of the coffee pod storage device may include a base, shaft, rotational disk, support frame, and a plurality of support members.

The base may be a foundation or support configured to allow the coffee pod storage device to remain upright. The base may be comprised of various materials, such as plastics, metals, etc. In embodiments, the base may have a larger length than the rest of the components of rotatable coffee pod storage device.

The shaft may be configured to be coupled to the base and the rotational disk. The shaft may be configured to extend away from the base to vertically offset the rotational disk from the base. The shaft may include a first portion and a section portion. The first portion may be angled to vertically offset the second portion from the base. The second portion may extend in a direction parallel to a width of the base, wherein the second portion may horizontally offset the rotational axis of the rotational disk.

The rotational disk may be configured to be coupled with the shaft and the support frame. The rotational disk may be configured to rotate in a first direction or a second direction. The axis of rotation of the rotational disk may be defined by the second portion of the shaft.

The support frame may be configured to be coupled with the rotational disk and the support members. The support frame may be configured to rotate along with the rotational disk. The support frame may include a plurality of circular inserts, wherein the circular inserts are configured to receive coffee pods. The circular inserts may be centrally located within the support frames, wherein the circular inserts are positioned adjacent to the rotational disk.

The support frame may have a plurality of arms that are configured to extend away from the support frame. At the distal ends of a pair of arms may be a support member.

The support members may be configured to secure and hold a coffee pod, while also allowing the coffee pod to be removed from the support members. In embodiments, each support member may have a first coffee pod holder and a second coffee pod holder. Each of the coffee pod holders may have an opening that is aligned with the faces of rotational disk. Accordingly, a coffee pod may be inserted or removed from a coffee pod holder from the front of back of the coffee pod storage device.

In other embodiments, a coffee pod storage device may include a magnetic back and arms. The magnetic back may be configured to be coupled with a magnetic surface, such as a fridge, kitchen appliance, etc. The arms may be configured to extend away from the magnetic back to allow a coffee pod to be inserted and removed from the coffee pod storage device. In one embodiment, the arms may include a curvature that is substantially similar to that of a coffee pod.

While in other embodiments, the arms may be substantially linear with a lip. The arms and the lip may be configured to secure and hold a coffee pod, while allowing the coffee pod to be removed from the storage device. Utilizing embodiments, the coffee pod storage device may be coupled to any number of desirable and unused surfaces, while storing coffee pods.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6 depicts a first side view of a coffee pod storage device, according to an embodiment.

FIG. 7 depicts second side view of a coffee pod storage device, according to an embodiment.

FIGS. 8-14 depict of a coffee pod storage device, according to an embodiment.

Figure 1:
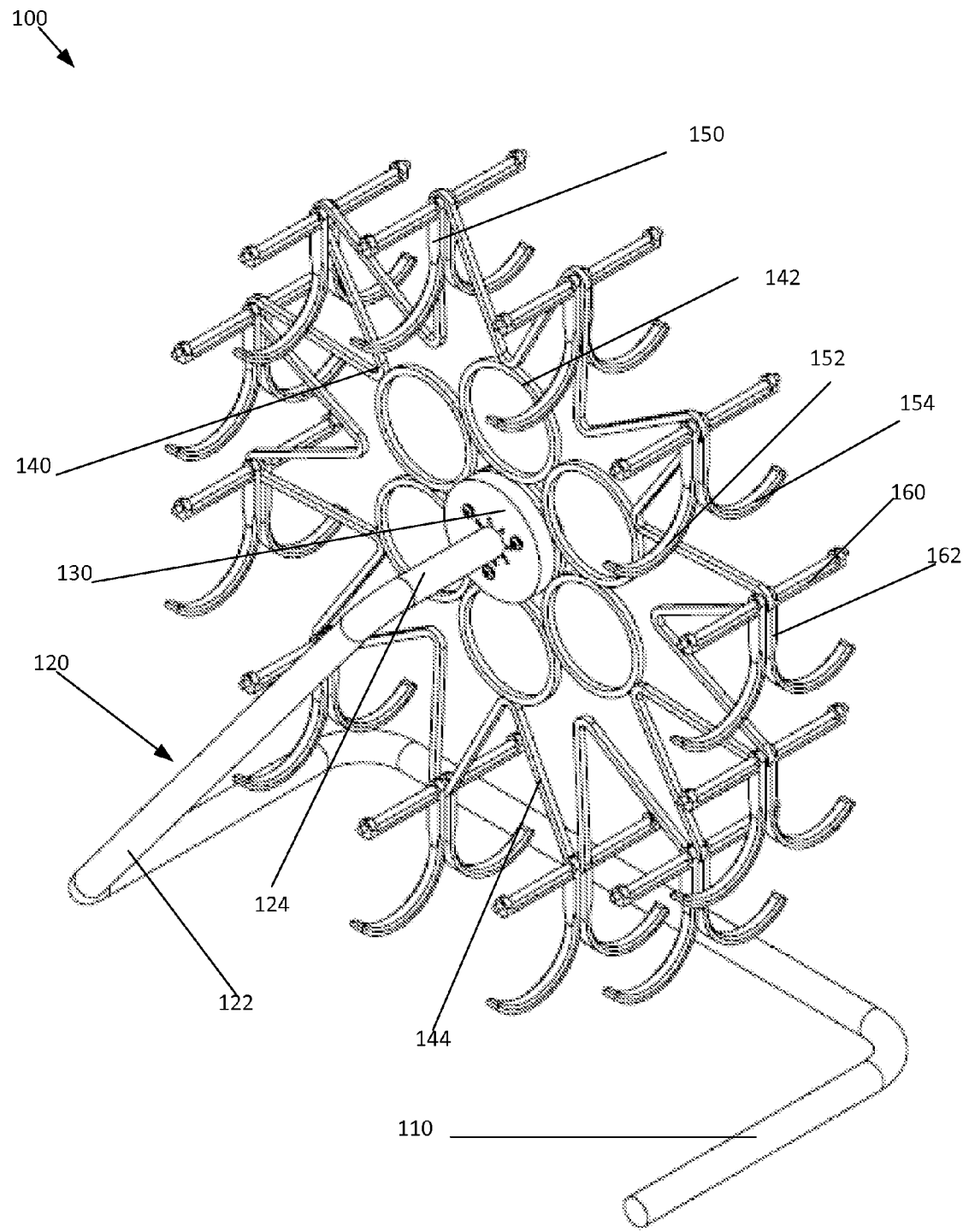
FIG. 1 depicts a perspective view of a coffee pod storage device, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In The following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a rotatable coffee pod storage device. The rotatable coffee pod storage device may have a plurality support members that are configured to receive coffee pods. The support members may be configured to receive coffee pods in directions that are perpendicular to the angle of rotation of the rotatable coffee pod storage device.

Accordingly, a user may be able to easily and effectively insert and remove a plurality of coffee pods, while also conveniently storing the coffee pods and reducing the amount of space required to store the coffee pods.

Turning now to FIG. 1, FIG. 1 depicts a perspective view of the coffee pod storage device 100. Coffee pod storage device 100 may be configured to be positioned on a counter surface, on an appliance, etc. Coffee pod storage device 100 may include a base 110, shaft 120, rotational disk 130, support frame 140, and a plurality of support members 150.

Base 110 may be a support that is configured to be placed on a surface such as a countertop. Base 110 may be a foundation or support configured to allow coffee pod storage device 100 to remain upright. Base 110 may be comprised of various materials, such as plastics, metals, etc. Base 110 may have a larger length than the rest of the components of rotatable coffee pod storage device 100. In embodiments, base 110 may have a substantially planar surface that is configured to support coffee pod storage device 100.

Shaft 120 may be coupled to base 110 and rotational disk 130. Shaft 130 may be configured to extend away from base 110 to vertically offset rotational 130 from base 110. In embodiments shaft 120 may include a first portion 122 and a second portion 124. First portion 122 may be configured to be angled away from base 110 to vertically offset second portion 124 from a support surface. First portion 122 may have a length that is at least as long as a radius of support frame 140.

Second portion 124 may be configured to extend away from first portion 122 in a direction that is parallel to a width of base 110. In embodiments, second portion 124 may have a length that is substantially similar to half the width of base 110.

Rotational disk 130 may be coupled with shaft 120 and support frame 140. Rotational disk 130 may be configured to rotate in a first direction or a second direction, wherein the first direction is an opposite direction. In embodiments, rotational disk 130 may rotated around an axis defined by second portion 124 of shaft 120.

Support frame 140 may be configured to couple with rotational disk 130 and support members 150. Support frame 140 may be configured to rotate along with rotational disk 130. In embodiments, support frame 140 may be coupled with and positioned adjacent to a circumference of rotational disk 130. Support frame 140 may include center portion 142 and a plurality of arms 144.

Center portion 142 may be located adjacent to rotational disk 130, wherein center portion 142 may include a plurality of circular inserts. The plurality of circular inserts may be aligned with the faces of the rotational disk 130, wherein coffee pods may be inserted into the circular inserts. Responsive to coffee pods being inserted into the circular inserts, the coffee pods may be stored within support frame 140.

The plurality of arms 144 may be configured to extend away from the circumferences of the plurality of circular inserts. The plurality of arms 144 may extend away from the circular inserts in a plane that is perpendicular to the axis of rotation of rotational disk 130. In embodiments, a first end of each of the plurality of arms may be proximate to circular inserts, and a second end of each of the arms 144 may be coupled with a support member 150.

Each of the plurality of support members 150 may be configured to be coupled with a distal end of corresponding arms 144. The support members 150 may be configured to secure and hold a coffee pod, while also allowing the coffee pod to be removed from support members 150.

In embodiments, each support member may have a first coffee pod holder 152 and a second coffee pod holder 154. Each of the coffee pod holders 150 may have an opening that is aligned with a face of rotational disk 130. Accordingly, a coffee pod may be inserted or removed from a support member 150 from the front of back of the coffee pod storage device 100.

Each support member 150 may be comprised a linear projection 160, a sidewall 162. The linear projection 160 may be configured to be coupled to an inner circumference of end of arms 144.

Sidewalls 162 may be positioned on each side of the inner circumference of arms 144 and coupled around linear projection 160. Each sidewall 162 may be configured to freely and independently rotate. Sidewall 162 may also include a curved portion, wherein the curved portion may correspond to the shape of a coffee pod. The distance between the distal ends of the curved portion and linear projection 160 may be long enough to allow a coffee pod to be inserted within support member 150. However, when a coffee pod is positioned within support member 150, the curved portion may apply force to secure the coffee pod within support member 150. More specifically, a coffee pod may be inserted through an orifice of between sidewall 162 and linear projection 160, which may cause sidewall 162 to expand. Responsive to sidewall 162 expanding, sidewall 162 may exert inward pressure upon the coffee pod to hold the coffee pod in place. However, a user may be able to apply sufficient force to act slide a coffee pod in and out of sidewall 162.

In embodiments, when no coffee pod is positioned within support member 150, sidewall 162 may freely hang downward based on the weight of support member 150. Responsive to a coffee pod being inserted into support member 150, sidewall 162 may rotate based on the weight of the coffee pod. In embodiments, the weight of the coffee pod positioned within a support member 150, may rotate support member 150 approximately fifteen degrees.

Figure 2:
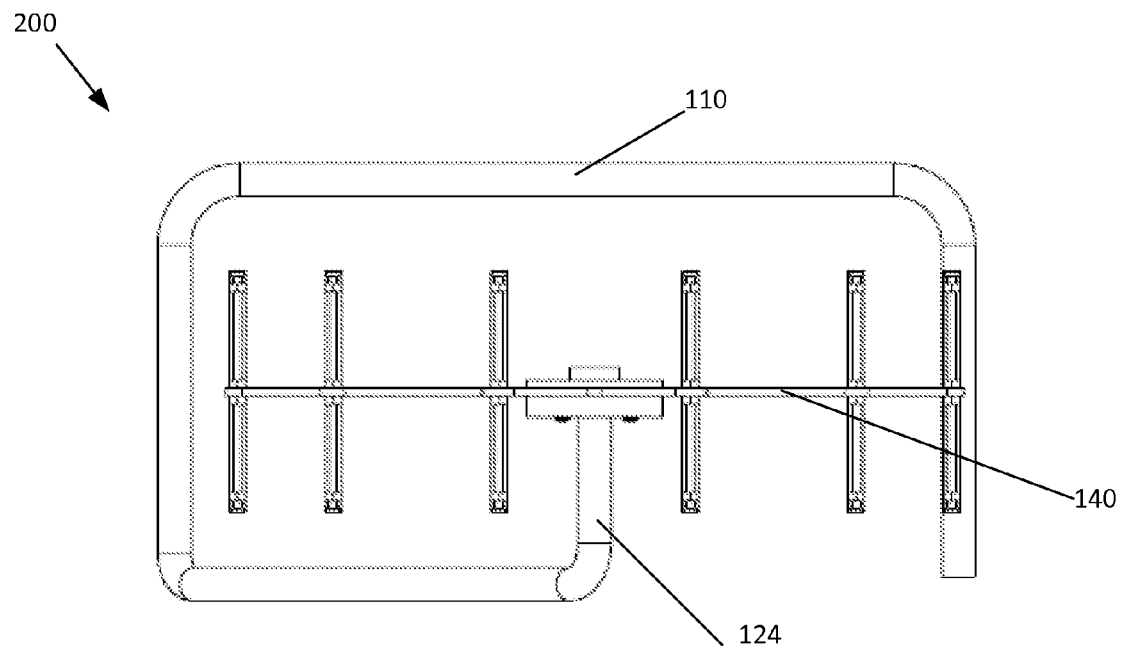
FIG. 2 depicts a top view of a coffee pod storage device, according to an embodiment.
Figure 3:
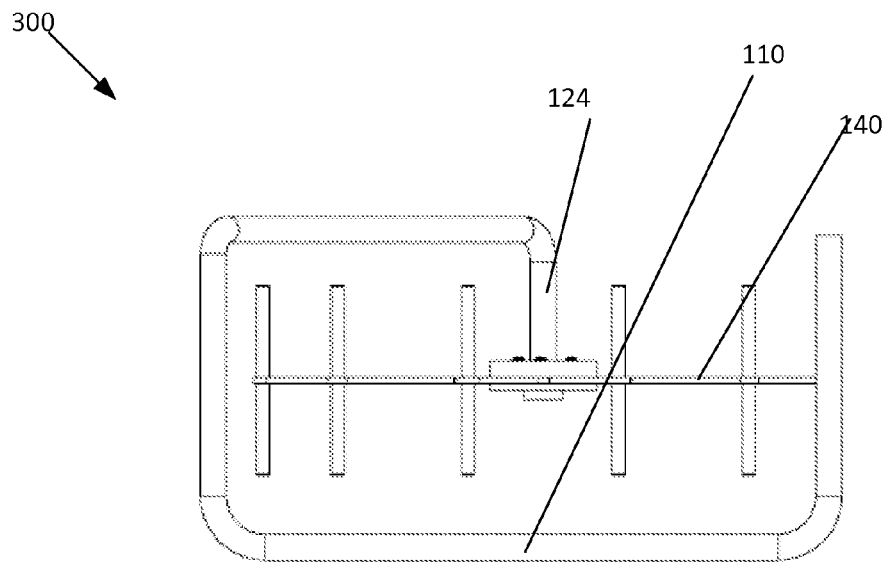
FIG. 3 depicts a bottom view of a coffee pod storage device, according to an embodiment.

FIG. 2 depicts a top view 200 and FIG. 3 depicts a bottom view 300 of coffee pod storage device 100. As depicted in FIGS. 2 and 3, the length of base 110 may be longer than a diameter of support frame 140.

Additionally, as depicted, the second portion 124 of shaft 120, may offset the rotational axis of rotation disk 130 to substantially the center of the length of base 110.

Figure 4:
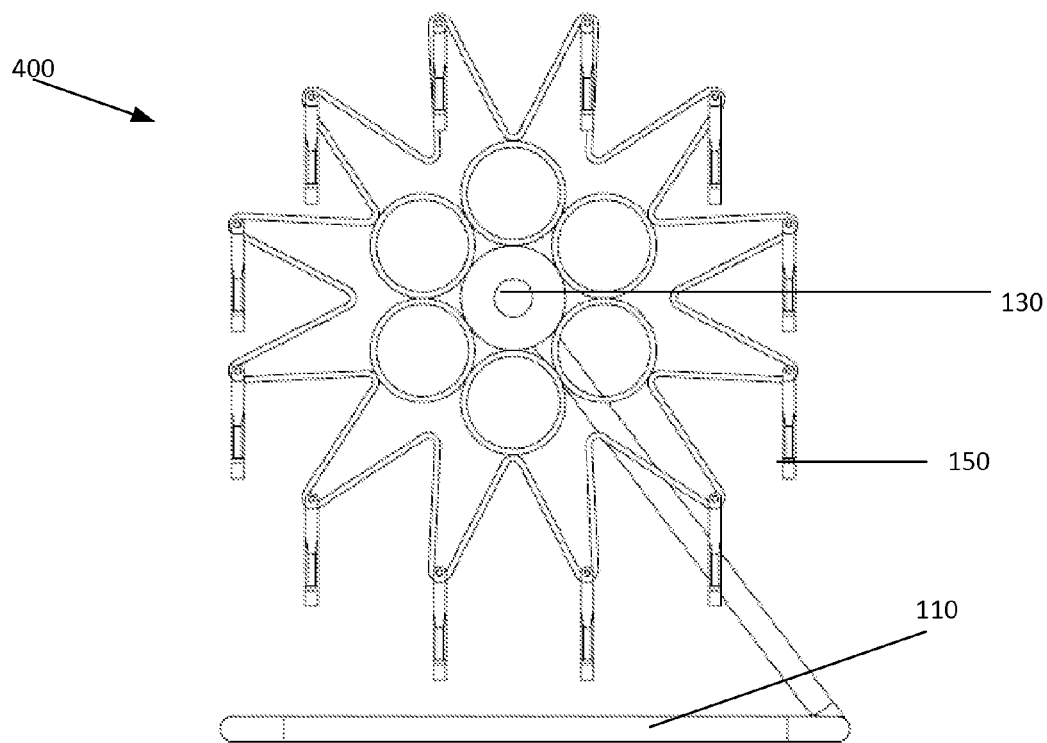
FIG. 4 depicts a front view of a coffee pod storage device, according to an embodiment.
Figure 5:
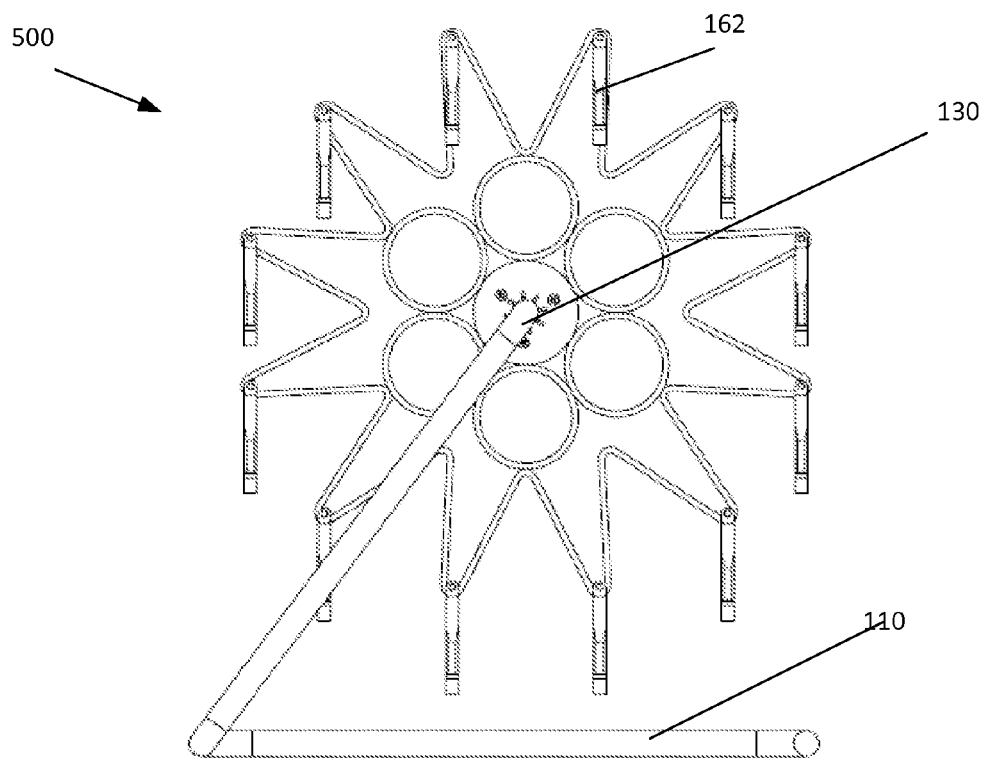
FIG. 5 depicts a back view of a coffee pod storage device, according to an embodiment.
Figure 8:
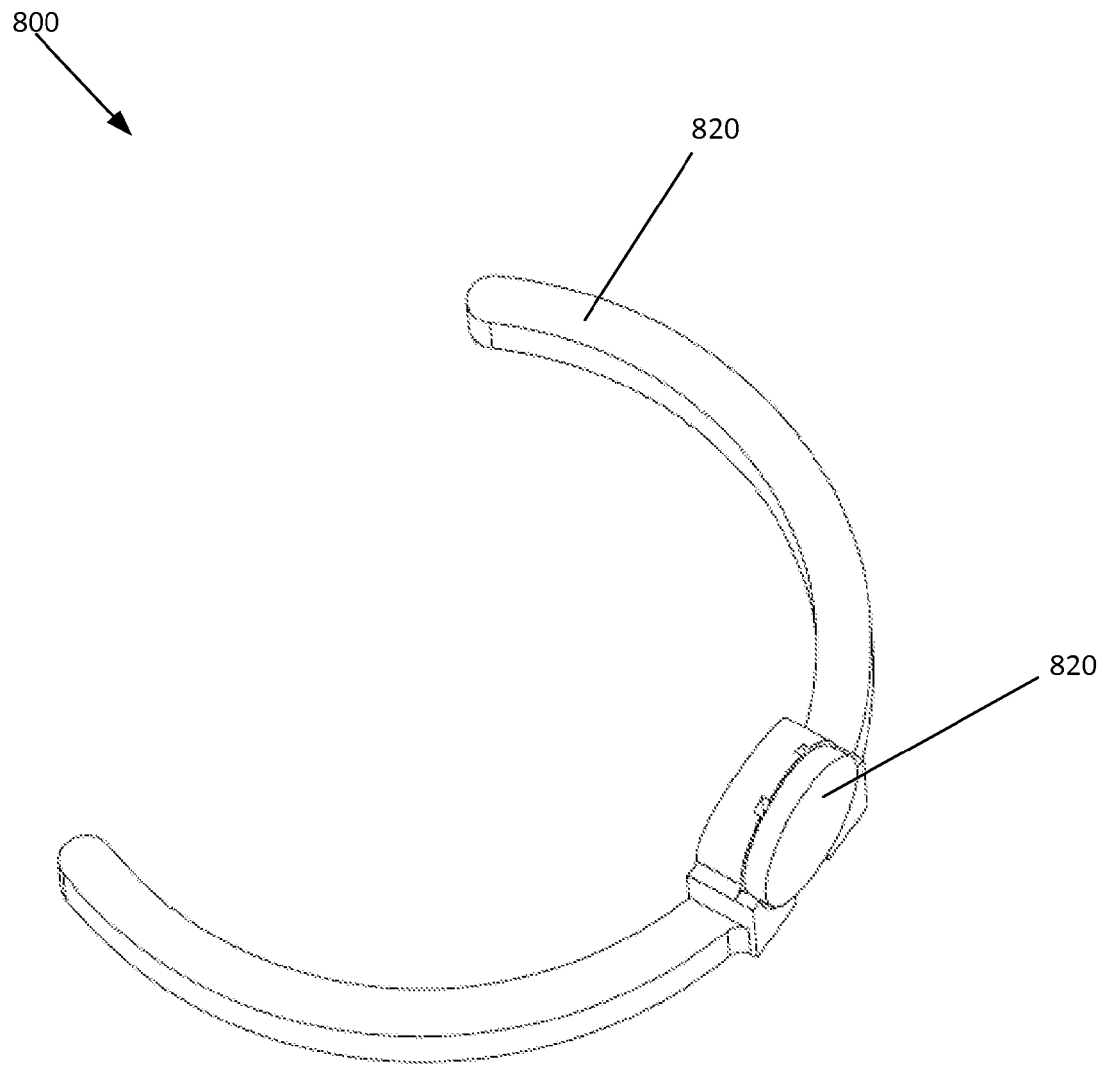
Figure 9:
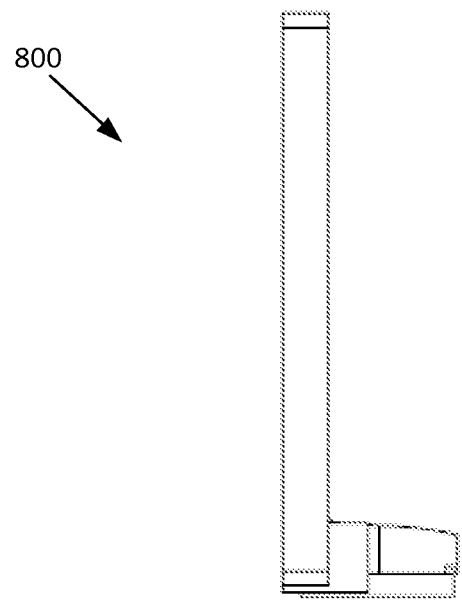
Figure 10:
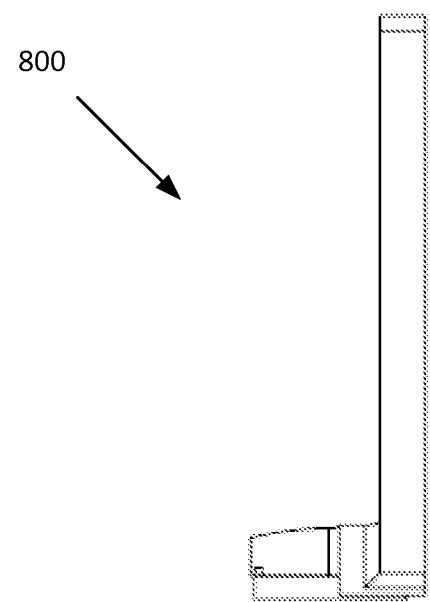
Figure 11:
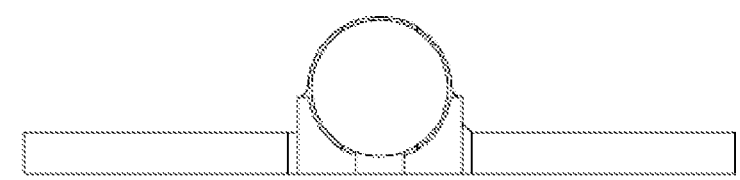
Figure 12:
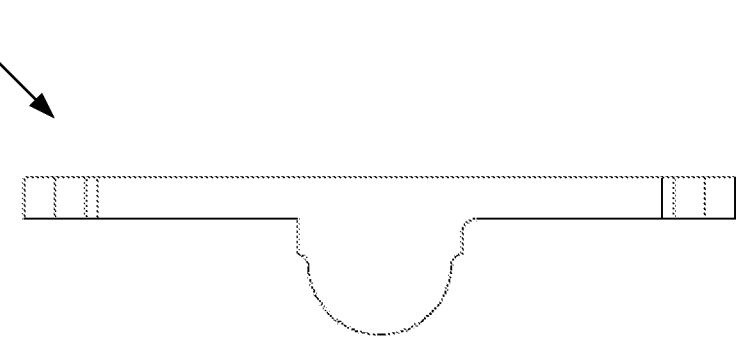
Figure 15:
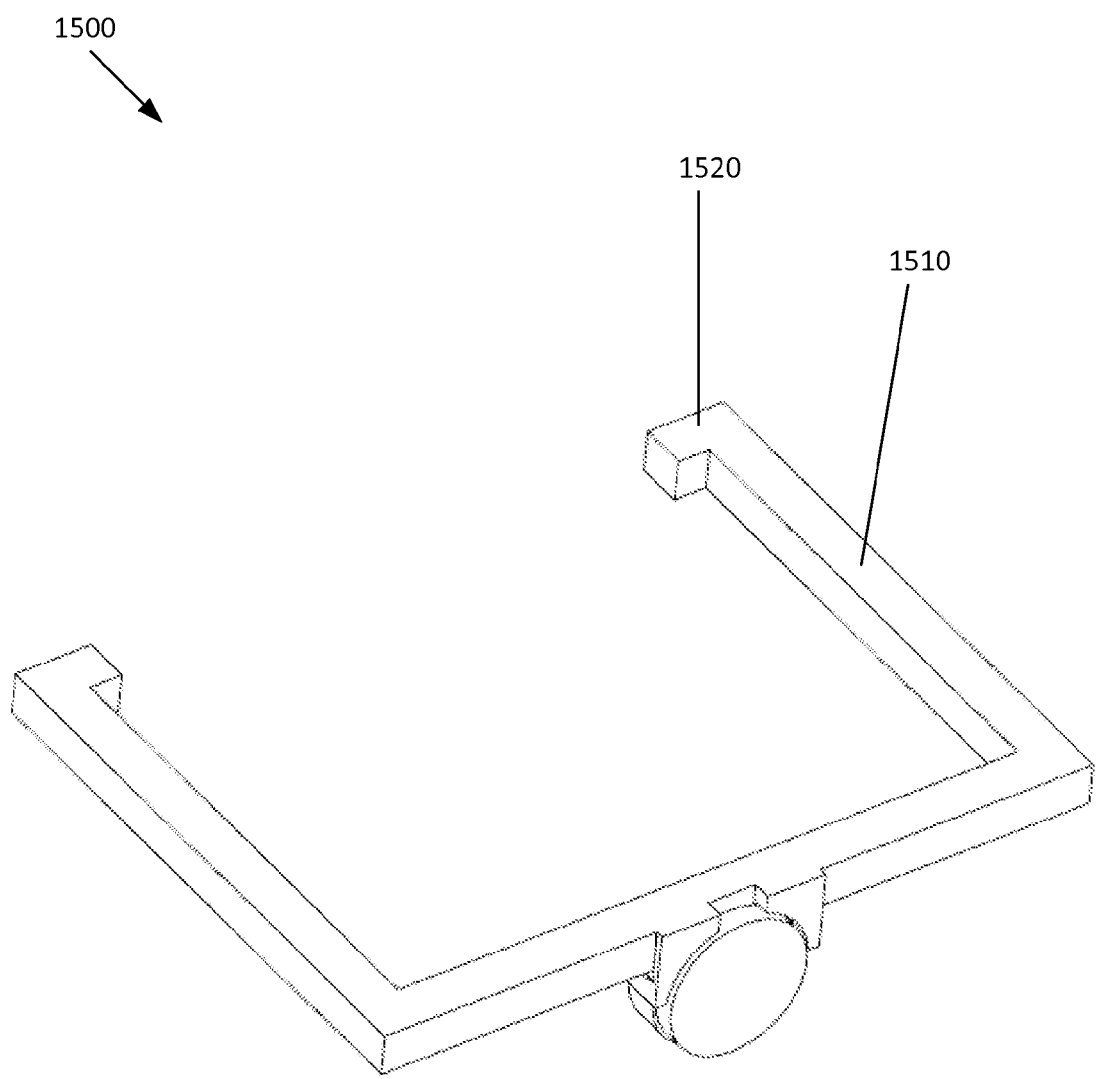
FIGS. 15-21 depict a coffee pod storage device, according to an embodiment.
Figure 16:
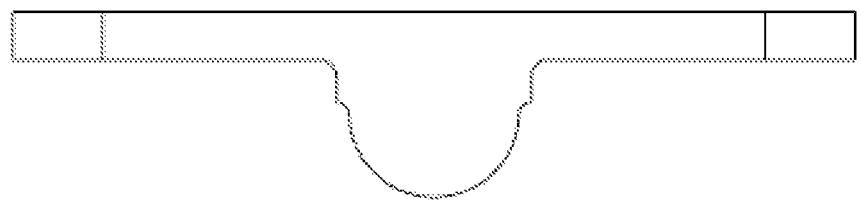
Figure 17:
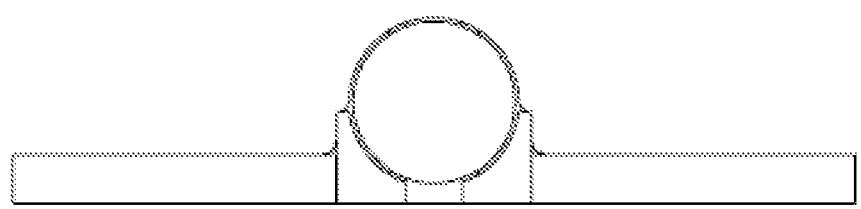
Figure 18:
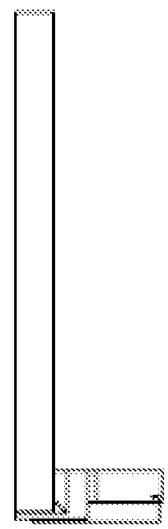
Figure 19:
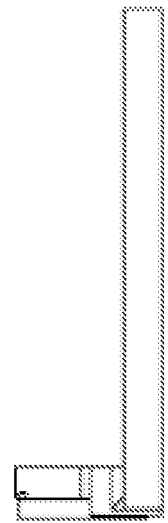
Figure 20:
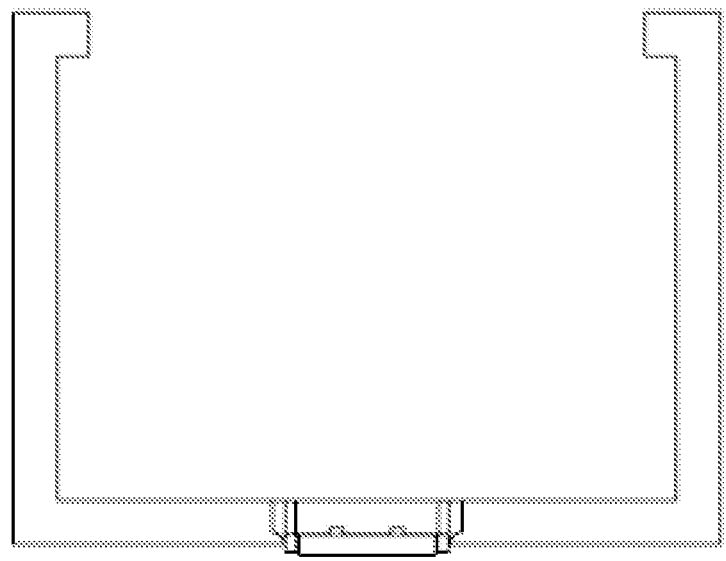
Figure 21:
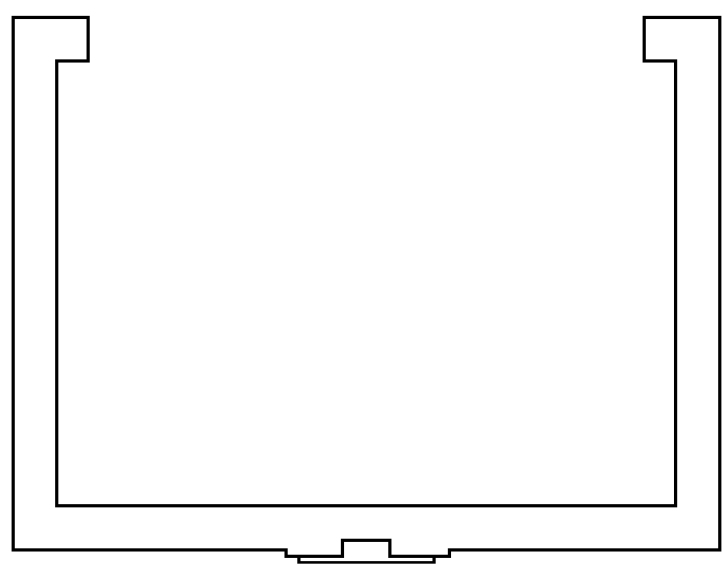

FIG. 4 depicts a front view 400 and FIG. 5 depicts a back view 500 of coffee pod storage device 100. As depicted by FIGS. 4 and 5, the rotational axis of rotational disk 130 may be substantially in the center of the width of base 110.

Furthermore, coffee pods may be inserted into support members 150 via a front face or back face of coffee pod storage device 100. Accordingly, a user may insert and/or remove a coffee pod from coffee pod storage device 100 from multiple directions.

FIGS. 6 and 7 depict a first side view 600 and a second side view 700 of coffee pod storage device 100. As depicted in FIGS. 6 and 7, there are no coffee pods positioned within support members 150. Accordingly, support members 150 may hang or be rotated in a direction that is perpendicular to the length of base 110, wherein the angle of rotation of disk 130 may be positioned in front of shaft 120.

Additionally, FIGS. 6 and 7 depict each support member 150 having an independent sidewall 162 and sidewall 164. Therefore, responsive to a coffee pod being inserted into a support member 150, the support member 150 may rotate independently from the other support members. Based on the angle of rotation of an individual support member 150, a user may be able to determine if a coffee pod is located in a support member 150 positioned behind another support member 150.

FIGS. 8-14 depict an embodiment of a coffee pod storage device 800. Coffee pod storage device 800 may include a magnetic back 810 and arms 820. Magnetic back 810 may be configured to be coupled with a magnetic surface, such as a fridge, kitchen appliance, etc. Arms 810 may be configured to extend away from the magnetic back to allow a coffee pod to be inserted and removed from the coffee pod storage device. As depicted in FIGS. 8-15, arms 820 may include a curvature that is substantially similar to that of a coffee pod. Accordingly, a coffee pod may be configured to be inserted into arms 820, wherein arms 820 may secure and hold the coffee pod.

Specifically, a coffee pod may be inserted through a top orifice of arms 820, which may cause arms 820 to expand. Responsive to arms 820 expanding, arms 820 may exert inward pressure upon the coffee pod to hold the coffee pod in place. However, a user may be able to apply sufficient force to act slide a coffee pod in and out of arms 820.

In embodiments, when magnetic back 810 is coupled to a magnetic surface, arms 820 may be positioned above magnetic back 810. The positioning of arms 820 with respect to magnetic back 810, may allow for magnetic back 810 to secure a coffee pod of greater weight.

While in other embodiments, the arms may be substantially linear with a lip. The arms and the lip may be configured to secure and hold a coffee pod, while allowing the coffee pod to be removed from the storage device. Utilizing embodiments, the coffee pod storage device may be coupled to any number of desirable and unused surfaces, while storing coffee pods.

FIGS. 15-21 depict an embodiment of a coffee pod storage device 1500. Elements of coffee pod storage device 1500 may be substantially similar to those described above. Therefore, for the sake of brevity, another description is omitted.

As depicted in coffee pod storage device 1500, arms 1510 may be substantially linear with a lip 1510. The arms 1510 and the lip 1520 may be configured to secure and hold a coffee pod, while allowing the coffee pod to be removed from the coffee pod storage device 1500. Utilizing embodiments, coffee pod storage device 1500 may be coupled to any number of desirable and unused surfaces, while storing coffee pods.

Figure 22:
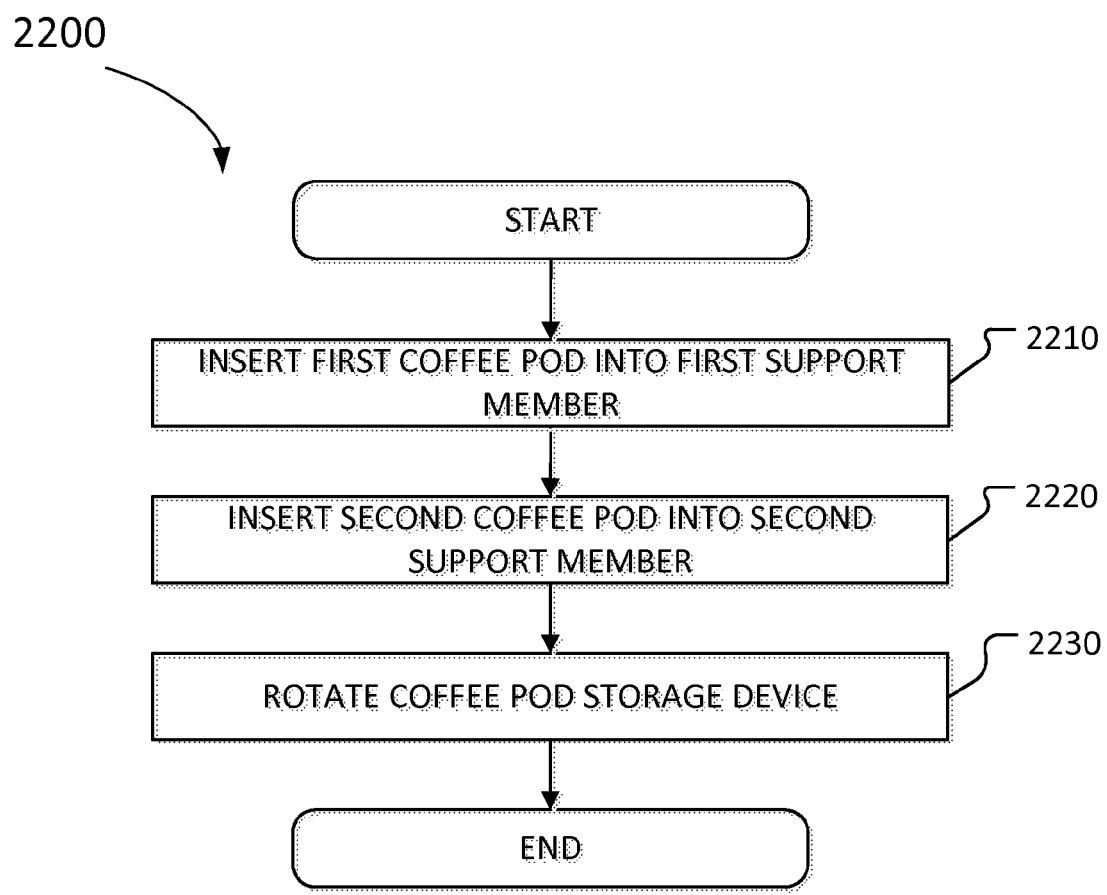
FIG. 22 depicts a method for storing coffee pods within a coffee pod storage device, according to an embodiment.

FIG. 22 depicts a method 2200 for storing coffee pods within a coffee pod storage device, according to an embodiment. The operations of method 2200 presented below are intended to be illustrative. In some embodiments, method 2200 may be accomplished with one or more additional operations not described, and/or without one or more of the operations discussed. Additionally, the order in which the operations of method 400 are illustrated in FIG. 22 and described below is not intended to be limiting.

At operation 2210, a coffee pod may be inserted into a first of a pair of support members. The coffee pod may be inserted into the support member through arms that have a first opening, wherein the first opening is perpendicular to an angle of rotation of the coffee pod storage device. Responsive to the coffee pod being inserted into the first of the pair of support members, the weight of the coffee pod may cause the first of the pair of support members to rotate, without rotating the second of the pair of support members.

At operation 2220, a coffee pod may be inserted into the second of the pair of support members. The coffee pod may be inserted into the support member through arms that have an opening, wherein the opening is perpendicular to an angle of rotation of the coffee pod storage device. Additionally, the opening in the second of the pair of support members may be positioned in a direction opposite the first direction.

At operation 2230, the coffee pod storage device may be rotated via a rotating disk. The coffee pod storage device may be rotated to allow a user to retrieve and/or insert coffee pods within the support members.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. A coffee pod storage device configured to hold coffee pods, comprising:
    a base configured to allow the coffee pod storage device to remain upright;
    a rotational disk configured to rotate in a first direction and a second direction;
    a shaft configured to vertically offset the rotational disk from the base and create an axis of rotation for the rotational disk;
    a support frame configured to couple with the rotational disk and rotate responsive to the rotational disk being rotate, the support frame including a plurality of circular inserts and a plurality of arms, wherein the plurality of circular inserts are aligned with a first face of the rotational disk, and each of the plurality of circular inserts are configured to receive a coffee pod, the plurality of arms configured to extend away from the circular inserts;
    a plurality of support members coupled to a distal end of the plurality of arms being configured to store the coffee pods, each pair of the plurality of support members including a linear projection, the linear projection being configured to be inserted through the pair of the plurality of support members, the pair of the plurality of support members including a first sidewall and second sidewall, the first sidewall having a first orifice aligning with the first face of the rotational disk and the second sidewall having a second orifice aligning with the second face of the rotational disk, wherein the first orifice is defined by a first end of the linear projection and an end of the first sidewall, and the second orifice is define by a second end of the linear projection and an end of the second sidewall.

2. The coffee pod storage device of claim 1, wherein the first sidewall and the second sidewall are configured to independently rotate.

3. The coffee pod storage device of claim 1, wherein the first office and the second orifice are aligned with the plurality of circular inserts.

4. The coffee pod storage device of claim 1, wherein the shaft linearly positions the angle of rotation of the rotational disk to be in the middle of a width and length of the base.

5. The coffee pod storage device of claim 1, wherein a width of the base is longer than a diameter of the support frame.

6. A coffee pod storage device configured to hold coffee pods,
    comprising:
    a base configured to allow the coffee pod storage device to remain upright;
    a rotational disk configured to rotate in a first direction and a second direction;
    a shaft configured to vertically offset the rotational disk from the base and create an axis of rotation for the rotational disk;
    a support frame configured to couple with the rotational disk and rotate responsive to the rotational disk being rotate, the support frame including a plurality of circular inserts and a plurality of arms, wherein the plurality of circular inserts are aligned with a first face of the rotational disk, and each of the plurality of circular inserts are configured to receive a coffee pod, the plurality of arms configured to extend away from the circular inserts;
    a plurality of support members coupled to a distal end of the plurality of arms being configured to store the coffee pods, each pair of the plurality of support members including a linear projection, the linear projection being configured to be inserted through the pair of the plurality of support members, the pair of the plurality of support members including a first sidewall and second sidewall, the first sidewall having a first orifice aligning with the first face of the rotational disk and the second sidewall having a second orifice aligning with the second face of the rotational disk, wherein when a coffee pod is not positioned within the first orifice, the first sidewall is positioned in a direction perpendicular to the base.

7. The coffee pod storage device of claim 6, wherein when a coffee pod is positioned within the first orifice, the first sidewall is rotated based on the weight of the coffee pod.

8. The coffee pod storage device of claim 7, wherein when the coffee pod is positioned within the first orifice, the first sidewall exerts force upon the circumference of the coffee pod to secure the coffee pod within the first orifice.

* * * * *